Feb. 16, 1965  L. E. NICKLA ETAL  3,169,359
COTTON PICKER CROP GUIDING AND PICKING STRUCTURE
Filed July 9, 1962  2 Sheets-Sheet 1

INVENTORS.
Louis E. Nickla
James J. Tracy

Feb. 16, 1965 L. E. NICKLA ETAL 3,169,359
COTTON PICKER CROP GUIDING AND PICKING STRUCTURE
Filed July 9, 1962 2 Sheets-Sheet 2

INVENTORS.
Louis E. Nickla
James D. Tracy

Paul O. Pippel
Atty.

United States Patent Office 3,169,359
Patented Feb. 16, 1965

3,169,359
COTTON PICKER CROP GUIDING AND
PICKING STRUCTURE
Louis E. Nickla and James T. Tracy, Memphis, Tenn., assignors to International Harvester Company, Chicago, Ill., a corporation of New Jersey
Filed July 9, 1962, Ser. No. 208,232
1 Claim. (Cl. 56—44)

This invention relates to cotton harvesters of the picker type.

In general cotton harvesters of the type under consideration have enjoyed exceptional popularity in that they performed an excellent harvesting operation. However, as experimentation proceeds to improve the quality of the cotton and the yield, the picking ability of current harvesters has been decreased. We have found that, without materially altering the basic characteristics of the cotton harvester, it is possible to improve its picking efficiency.

A general object of the invention is to provide a novel cotton harvester having an improved plant passage to obtain minimum dropping losses and to improve presentation of the cotton to the picking mechanism.

A further object of the invention is to provide a novel harvester comprising a novel plant passage providing a path for the plants such that the gathering mechanism of the harvester is provided with increased dwell time within the plant to improve the picking efficacy of the picker spindle.

A still further object of the invention is to provide a novel plant passage structure in the cotton harvester such that the plant is continuously held under compression as contrasted with previous practices where the plant would alternatively be compacted and expanded and then again compacted.

A still further object of the invention is to provide a novel plant passage in a cotton harvester which comprises a plurality of yieldably loaded compressor sheets which force the plant against the picker spindles on the opposite side of the throat and wherein the compressor sheets are so formed as to retain the plants a maximum amount of time on the spindles.

These and other objects and advantages inherent in and encompassed in the invention will become more readily apparent from the specification and the drawings, wherein.

Figure 1:
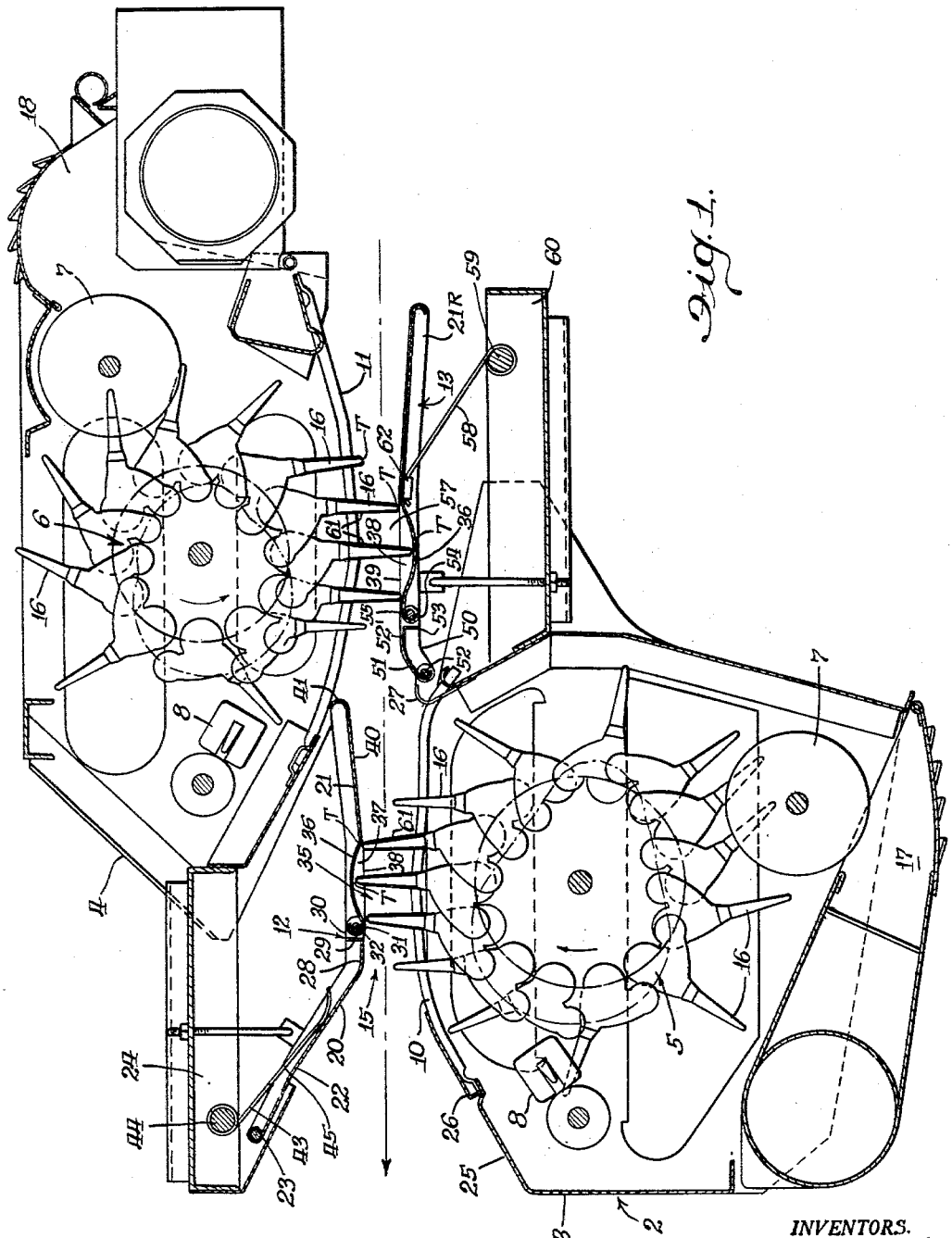
FIGURE 1 is a horizontal sectional view of the novel harvester.

Describing the invention in detail and having particular reference to the drawings, the cotton picker unit generally designated 2 comprises a housing structure having left and right counterparts 3 and 4, which respectively enclose picker drums 5, 6, a doffing mechanism 7 and the spindle moistener mechanism 8. These are conventional structures more or less.

The housings 3 and 4 are defined by a plurality of vertically spaced slats 10 and 11 with opposing compressor sheet structures 12 and 13 which collectively define a plant throat or passage 15. It will be understood that the rotors or drums 5 and 6 rotate in the direction of the arrows as shown in FIGURE 1 and that pursuant to such rotation the rotors progressively insert and withdraw a plurality of spindles 16, 16 with respect to the plant passage. The spindles are adapted to rotate about their individual substantial horizontally axes and pursuant to such rotation and the rotation of the drums which is timed to the speed of the machine as it advances along a row of cotton plants so that there is no movement or relatively very little movement of translation between the spindles and the plants the spindles in revolving and being provided with snagging means, wind the cotton and pluck it from the bolls and withdraw the cotton into the respective housing whereat it is acted on by the respective doffing mechanism which casts the cotton into the conveying ductwork, that is, from the left one into the ductwork indicated at 17 and from the right one to the duckwork indicated at 18.

The present invention concerns the improvement and position of the compressor sheets and it will be readily seen that the front compressor sheet structure 12 comprises a front portion 20 and a rear portion 21. The front portion, as best seen in FIGURE 1, is of substantially the height of the drum and provides a forwardly and outwardly diverging portion 22 which at its forward end is curved around a substantially vertical pivot member 23 which is fastened to the associated framework 24 of the housing portion 4. The paneling 22 opposes a similarly outwardly and forwardly angled upright paneling 25 of the leftward housing portion 3 and paneling 25 diverging forwardly with the paneling 22 and being provided with a slat mounting structure 26 which supports the forward ends of the slat 10.

The slats, as best seen in FIGURE 1, generally curve toward the throat structure in a rearward direction and at their rear ends are supported from the perforated post wall 27.

The rear edge of the forward portion 20 of the compressor sheet 12 terminates its panel 22 in a rear end portion 28 which is provided with an outwardly directed flange 29 having rearwardly extending ears 30 which are pivotally connected as by the pivot member 31 to the hook-front portion 32 of the rear compressor section 21. Thus it will be seen that the entire compressor assembly pivots about the forward axis or pivot 23 and that the segments 20 and 21 pivot with respect to each other about the vertical pivot axis 31. The compressor portion 21 has its forward portion located in the picking zone 35 of the forward drum 5 and as seen in FIG. 1 in this area the spindles 16 project farther into the throat and penetrate the plant for the full extent of their lengths. In order to increase the dwell time of the spindles within the plant there is provided an outwardly concaved section 36 which is substantially concentric with the path of movement of the outer tips of the fingers in that area, and in effect, the concavity 36 forms a pocket 37 which admits the tip ends T of the fingers between a plurality of vertically spaced ribs 38, 38. It will be realized that the free or outer edges 39 of the ribs are substantially flush with the plant throat side that is that they do not project into the plant passage and therefore offer no obstruction to the movement of the plants and therefore do not strip or in any way hinder or in any way knock off cotton. In fact, the ribs permit the spindle ends to penetrate through the plant and thus insure maximum coverage of the plant by the picker spindle. Furthermore, by providing backing for the end of the picker finger for a substantially prolonged period any available cotton in the region of the spindle is thus apt to be caught by the spindle and picked. The panel section 21 rearwardly of the concavity or pocket portion extends substantially straight rearwardly substantially in line with the outer free edges 39 of the ribs 38, the rear portion 40 being terminated in a curved rear edge section 41 which bears against the forward ends of the slat bars 11 of the rightward or the rear drum 6.

The compressor sheet structure 12 is biased in the direction of the plant passage by torsion spring means 43 which are anchored as at 44 to the framework 24 of the housing 4, the spring means having an output arm portion 45 which bears against the backside of the front portion 30 of the compressor sheet structure.

The rear compressor sheet 50 is in essence the same as the front sheet and corresponding reference numerals therefore are used to identify the same parts. The sheet 50 has front and rear portions 51, 21R, the front portion being pivoted on a vertical axis at 52 behind the post 27 and having a rear edge 52' with a flange 53 provided with ears 54 which are pivoted at 55 to the forward end of the rear portion 21R which has the concavity 36 with ribs 38 in the picking zone 57 of the rear drum. The rear compressor sheet structure is biased toward the throat by the torsion springs 58 which are anchored to post 59 on frame 60 of housing 3, springs 58 bearing against panel 21R at 62.

Figure 3:
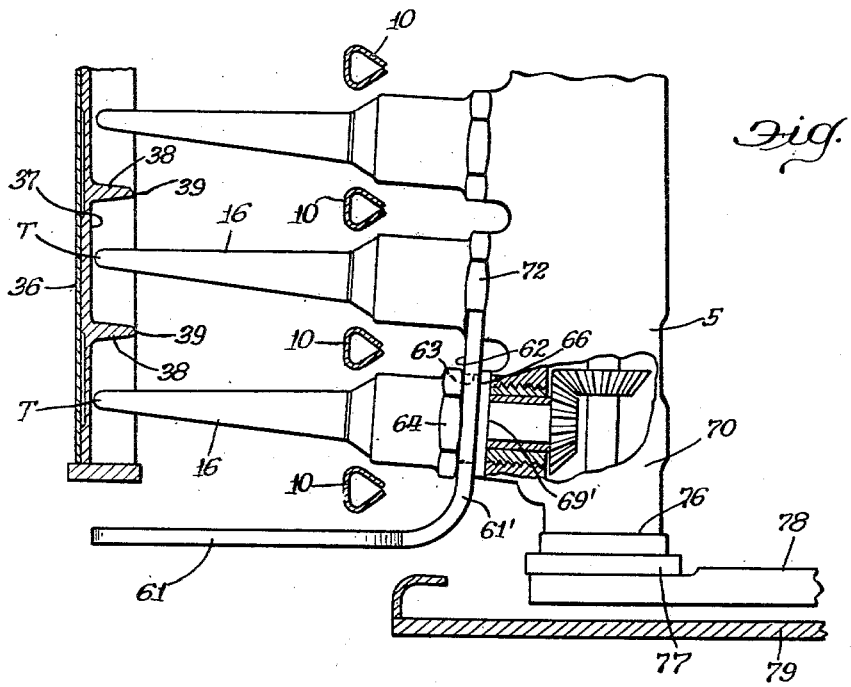
FIGURE 3 is a cross-sectional view taken substantially on the line 3—3 of FIGURE 2.
Figure 2:
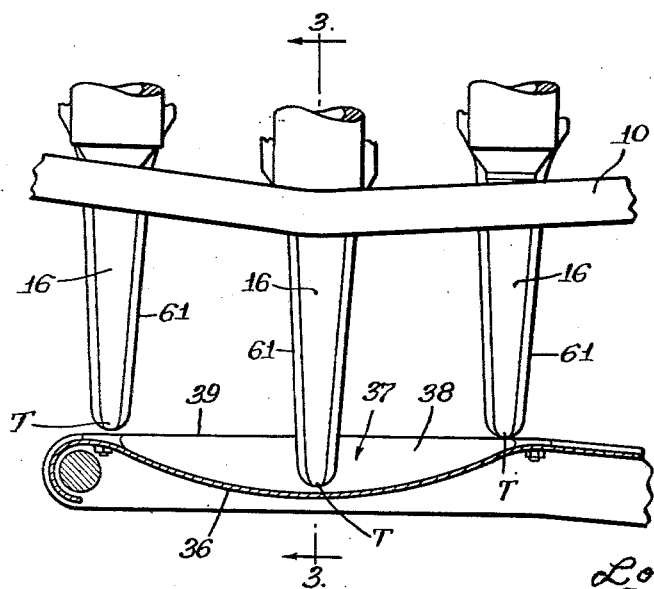
FIGURE 2 is an enlarged fragmentary sectional view of the concave portion of FIGURE 1.

As seen in FIGURES 2 and 3, the lowermost spindles are backed up by the low boll lifter fingers 61 which have a fastening flange 61' inserted between the nut 64 which engages side 63 of the flange 61', said flange having a back side 66 which abuts washer 69 which engages the boss 69' of the column 70 which forms the rotor 5 or 6, column 70 being pivoted at 76 on the pedestal base 77 formed with the plate 78 which is shielded by the base wall 79.

The finger 61 abuts at the upper end of its flange 61' against the next spindle nut 72.

What is claimed is:

In a cotton harvester movable forwardly over a field of cotton plants: housing structure providing a passage for successively passing earthborne cotton plants through the harvester, a picker drum mounted in the housing structure for rotation on an upright axis including vertically spaced apart and radially extending spindle members operative to successively move in an arc into the passage to collect cotton from the plants and carry the same inwardly of the housing structure, said passage defined by compressor means opposing the drum and having a leading straight portion substantially parallel to the direction of travel and an adjoining curved pocket portion contoured to said arc, said pocket portion being of limited extent and encompassing only an area wherein said spindles project the maximum amount into said passage, and a plurality of ribs extending across said curved portion and having edge surfaces adjacent to the drum subtending said arc, said ribs intercalating with said spindles.

References Cited in the file of this patent
UNITED STATES PATENTS

| | | |
|---|---|---|
| 1,910,307 | Rust | May 23, 1933 |
| 2,333,965 | Weems | Nov. 9, 1943 |
| 2,576,567 | Brown | Nov. 27, 1951 |
| 3,039,258 | Cafaro | June 19, 1962 |